UNITED STATES PATENT OFFICE.

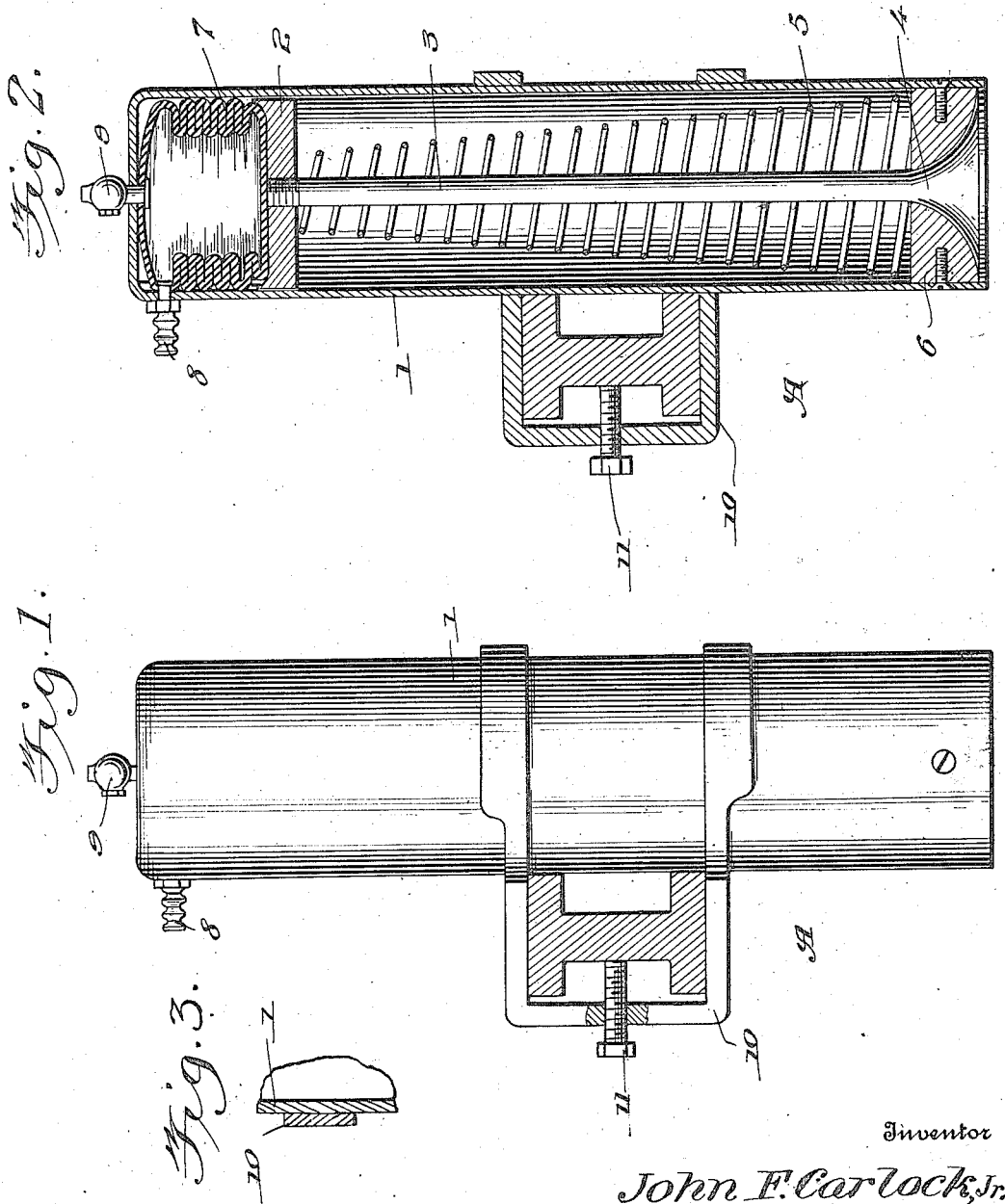

JOHN F. CARLOCK, JR., OF DENNIS, MONTANA.

AUTOMOBILE-JACK.

1,149,114. Specification of Letters Patent. Patented Aug. 3, 1915.

Application filed December 6, 1913. Serial No. 805,098.

*To all whom it may concern:*

Be it known that I, JOHN F. CARLOCK, Jr., a citizen of the United States, residing at Dennis, in the county of Custer and State of Montana, have invented new and useful Improvements in Automobile-Jacks, of which the following is a specification.

The invention contemplates the provision of a jack of novel construction, so as to facilitate the jacking up of any one of the wheels of a vehicle when the tire requires attention either to repair a puncture, or blowout, or to replace a worn tire by a new one.

The invention consists of the novel features, details of construction and combination of parts, which hereinafter will be more particularly set forth, illustrated in the accompanying drawings, and pointed out in the appended claim.

Figure 1 is a view in elevation of a pneumatic jack. Fig. 2 is a sectional view of the jack. Fig. 3 is a sectional detail view showing a portion of the casing of the jack and clip attached thereto.

Corresponding and like parts are referred to in the following description, and indicated in all the views of the drawings, by the same reference characters.

The lifting devices, or jacks, are indicated generally by the reference letter A and the same may be secured to the end portions of the axle in any manner. Each of the jacks comprises a casing 1 within which a plunger 2 is arranged to operate, the stem 3 of the plunger projecting beyond an end of the casing and having a foot 4 of sufficient area to enable ample purchase being obtained upon the surface for sustaining the load when the jack is in operation. A spring 5 of the expansible helical variety is located within the casing 1 and is confined between the plunger 2 and the lower end 6 of the casing and normally holds the plunger elevated. The stem 3 operates through an opening formed centrally in the end 6. The upper side of the plunger 2 is preferably concave to form a seat for a pneumatic sack 7. A nipple 8 extends through a side of the casing 1 and is connected with the pneumatic sack 7. A relief valve 9 is connected with the pneumatic sack to prevent dangerous internal pressure. As hereinbefore stated the device may be secured to the axle in any manner. As indicated in the drawings a clip 10 is provided and is fastened to the axle by means of a set screw 11.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new is:—

A pneumatic jack comprising a casing closed at both ends, the lower end being provided with an opening, a plunger arranged to reciprocate within the casing and having a stem adapted to project through said opening in one end of the casing, a pneumatic sack confined between the upper end of the casing and said plunger and adapted when inflated to project said plunger, a spring encircling said stem and operating to normally maintain the plunger retracted and wholly positioned within the casing, said stem terminating to provide a relatively broad foot portion, and the lower end of said casing having a correspondingly shaped recess for the reception of said foot to wholly conceal the latter to limit the upward movement of said plunger.

In testimony whereof I affix my signature in presence of two witnesses.

JOHN F. CARLOCK, JR.

Witnesses:
JOHN KEHOE,
MARK F. JONES.